(12) United States Patent
Ashford et al.

(10) Patent No.: US 9,033,215 B1
(45) Date of Patent: May 19, 2015

(54) LOCATION BASED DEVICE CONTROL

(75) Inventors: Curtis M. Ashford, St. Peters, MO (US); David Charles West, Chesterfield, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/406,492

(22) Filed: Feb. 27, 2012

(51) Int. Cl.
*G06F 17/00* (2006.01)
*G06F 3/0354* (2013.01)
*G06K 9/22* (2006.01)

(52) U.S. Cl.
CPC .............. *G06F 3/03545* (2013.01); *G06K 9/22* (2013.01)

(58) Field of Classification Search
USPC ........................ 235/375; 725/76; 340/5.2, 963
See application file for complete search history.

(56) References Cited

U.S. PATENT DOCUMENTS

| | | | |
|---|---|---|---|
| 4,835,604 A | 5/1989 | Kondo et al. | |
| 5,964,111 A * | 10/1999 | Lambert | 70/493 |
| 6,813,777 B1 * | 11/2004 | Weinberger et al. | 725/76 |
| 6,963,292 B1 * | 11/2005 | White | 340/963 |
| 7,027,767 B2 | 4/2006 | de La Chapelle et al. | |
| 7,135,974 B2 | 11/2006 | Hernandez et al. | |
| 7,567,186 B2 | 7/2009 | Endress et al. | |
| 7,791,481 B2 | 9/2010 | Landt et al. | |
| 7,844,702 B1 * | 11/2010 | Manczak et al. | 709/224 |
| 2010/0283576 A1 * | 11/2010 | Loughlin et al. | 340/5.2 |
| 2011/0231236 A1 * | 9/2011 | Gonzalez | 705/14.25 |
| 2012/0188112 A1 * | 7/2012 | Beals et al. | 341/176 |

* cited by examiner

*Primary Examiner* — Christopher Stanford
*Assistant Examiner* — Asifa Habib
(74) *Attorney, Agent, or Firm* — Ameh IP; Lowell Campbell; Elahe Toosi

(57) ABSTRACT

A system and method for configuring an electronic device is disclosed. A location identifier module comprising a location identifier is positioned at a location, and the electronic device is positioned at the location. The electronic device is configured based on the location identifier.

17 Claims, 5 Drawing Sheets

LOCATION BASED DEVICE CONTROL

FIELD

Embodiments of the present disclosure relate generally to programmable devices. More particularly, embodiments of the present disclosure relate to programmable device programming.

BACKGROUND

Commercial aircraft are increasingly adding additional wiring and complexity as more modules and capabilities are added to the aircraft. Added wiring results in increased weight, power and heat load as options installed in the aircraft increase. A proliferation of model numbers and individual part numbers further increases complexity and a potential for devices to be installed in a wrong location.

SUMMARY

A system and method for configuring an electronic device is disclosed. A location identifier module comprising a location identifier is positioned at a location, and the electronic device is positioned at the location. The electronic device is configured based on the location identifier.

In this manner reduced wiring results in decreased weight, power and heat load as options installed in aircraft increase. Additionally a potential for devices to be installed in an incorrect location decreases.

In an embodiment, a method for configuring an electronic device positions a location identifier module comprising a location identifier at a location, and positions the electronic device at the location. The method further configures the electronic device based on the location identifier.

In another embodiment, a location-based device configuration system comprises a location identifier module and an electronic device. The location identifier module is operable to indicate a location identifier. The electronic device comprises a location receiver module operable to receive the location identifier from the location identifier module, and control logic operable to configure an operation of the electronic device based on the location identifier.

In a further embodiment, a location configurable device comprises a location receiver module and control logic. The location receiver module is operable to receive a location identifier from a location identifier module, and the control logic is operable to configure an operation of the electronic device based on the location identifier.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to location determination, coding methods, electronic circuits, electronic devices, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, an aircraft cabin light switch. Embodiments of the disclosure, however, are not limited to such aircraft cabin light switch applications, and the techniques described herein may also be utilized in other applications. For example but without limitation, embodiments may be applicable to electronic systems of spacecraft, submarines, buses, houses, ships, trains, or other environment comprising configurable devices.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
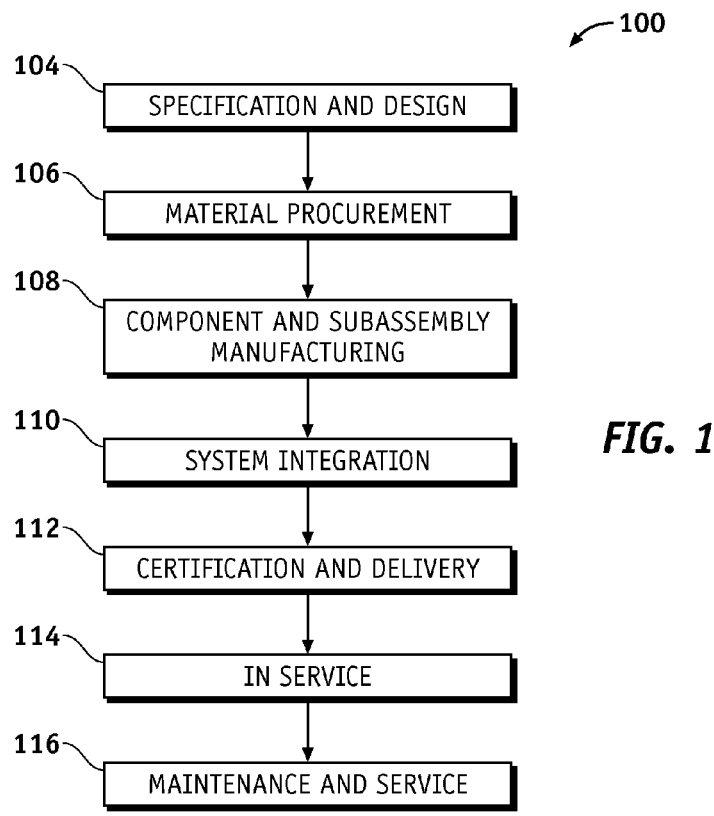
FIG. 1 is an illustration of a flow diagram of an exemplary aircraft production and service methodology.
Figure 2:
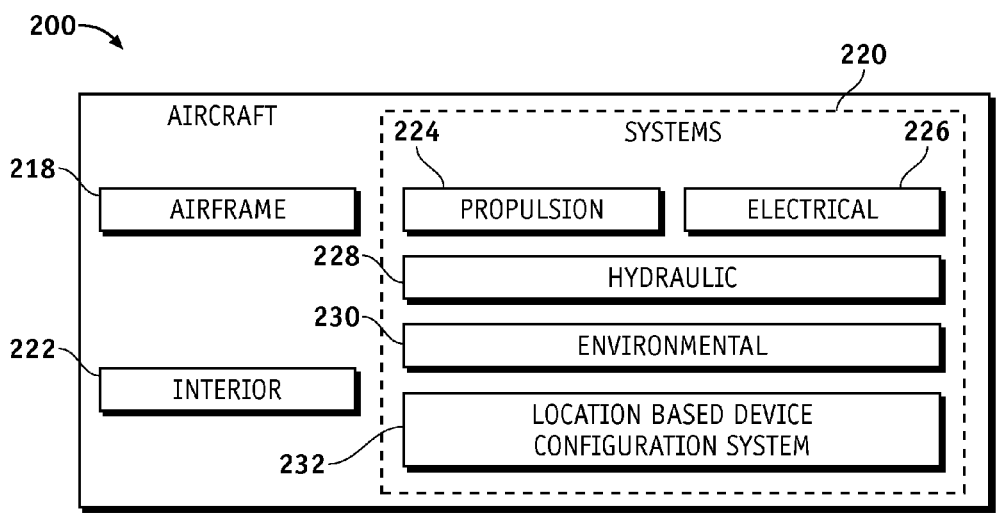
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 2, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a location based device configuration system 232. Any number of other systems may also be included. Although an aerospace example is shown, the embodiments of the disclosure may be applied to other industries.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Embodiments of the disclosure provide a system and method for location based device configuration.

Figure 3:
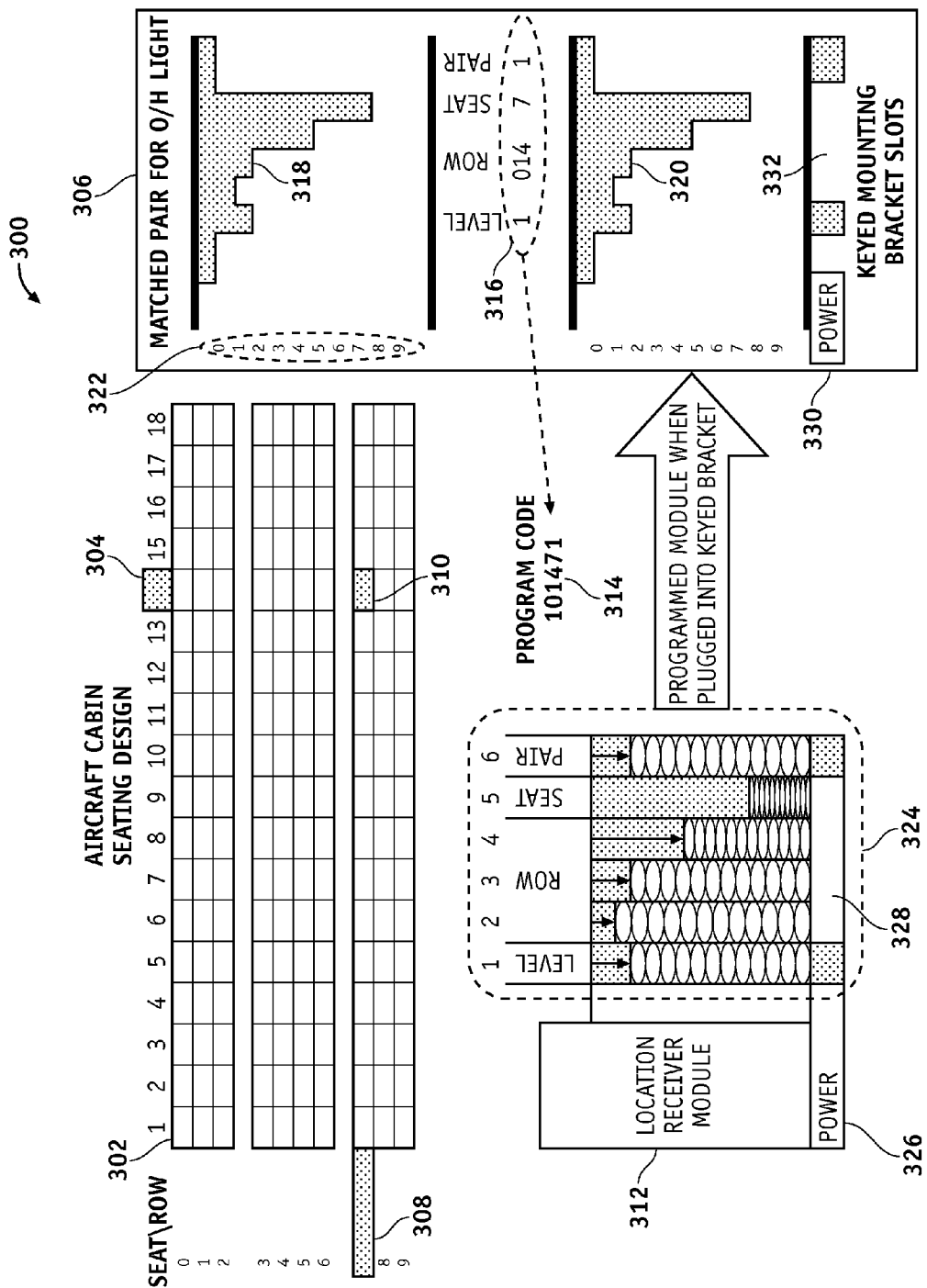
FIG. 3 is an illustration of an exemplary location-based device configuration system according to an embodiment of the disclosure.

FIG. 3 is an illustration of an exemplary location-based device configuration system 300 (system 300) according to an embodiment of the disclosure. System 300 may comprise, an aircraft cabin seating design 302 (cabin 302), a location identifier module 306, and a location receiver module 312.

The cabin 302 may comprise seats configured in rows of an aircraft cabin. For a row 304 and a seat number 308, a seat light switch 310 may be used to turn on an overhead (O/H) light (not shown). The seat light switch 310 may comprise, for example but without limitation, a switch wirelessly coupled to the light, a switch wirelessly coupled to a fan, or other device. The seat light switch 310 is configured to turn the light on by sending a wireless signal to the light. In order for the seat light switch 310 to communicate with the light at the row 304 and the seat number 308 but no other lights in the cabin 302, the seat light switch 310 and the light are "paired" to recognize only each other's communications. Pairing may comprise, for example but without limitation, sharing a common key code, or other pairing method. Various embodiments of the disclosure can be used to program the seat light switch 310 using a location identifier as explained below coupled to the seat light switch 310.

The location identifier module 306 is encoded with a location identifier such as a program code 314 (code 314) comprising seat location information and optionally other configuration information. By programming the seat light switch 310, a general purpose switch may be used that is customized by the location identifier module 306. The location identifier may comprise, for example but without limitation, a grid coordinate, seat and row coordinates, a two-dimensional (2-D) grid coordinate, a three-dimensional (3-D) grid coordinate, a Global Positioning Systems (GPS) coordinate, or other location identifier.

The location identifier module 306 may be used to program both (e.g., a matched pair) the O/H light and the seat light switch 310 to provide a matched pair for the O/H light. In the embodiment shown in FIG. 3, the code 314 comprises a program code (e.g., "101471") indicating level 1, row 014, seat 7 and pair 1 generating a code configuration 320 corresponding to the program code (e.g., "101471"). A matching code configuration 318 is generated to match the seat light switch 310 to the light.

A displacement depth 322 indicates a depth of a key displacement. The location identifier module 306 may be powered by a power source 330. Keyed mounting bracket slots 332 are configured to plug the location receiver module 312 into the location identifier module 306. The keyed mounting bracket slots 332 may be used to insure the location receiver module 312 is matched to a proper type of the location identifier module 306. The location identifier module 306 may comprise, for example but without limitation, a physical linear key (e.g., like a house key), a 2-D key 500 (FIG. 5), a wireless key, or other key code method.

The location receiver module 312 (switch transmit or lamp receive module) is located in the seat light switch 310 and comprises slots 324. The location receiver module 312 is configured to receive the code 314 from the location identifier module 306, and pair the seat light switch 310 to the light. The location receiver module 312 may be plugged into the keyed mounting bracket slots 332 via keyed teeth 328 and powered by a power source 326.

Figure 4:
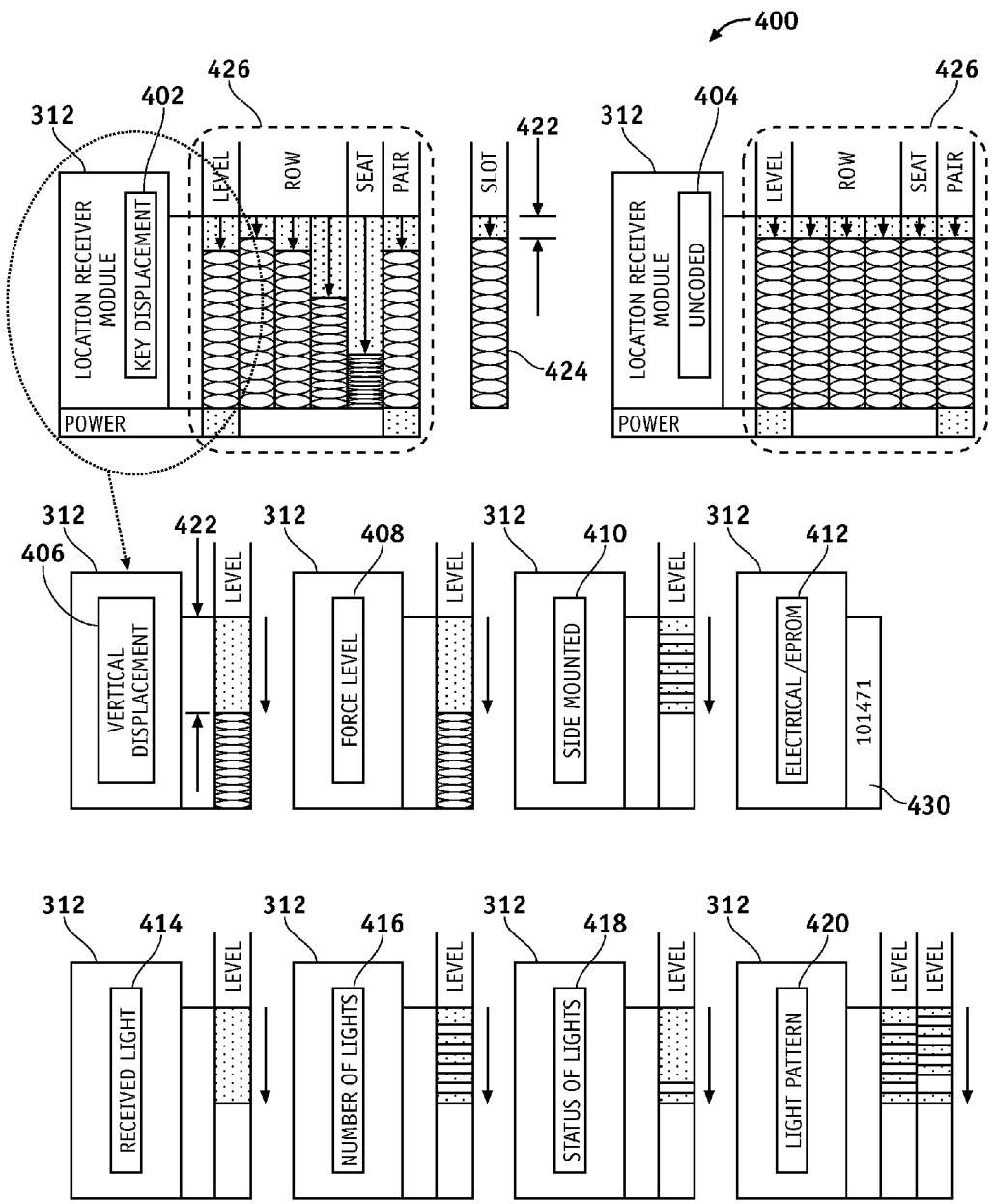
FIG. 4 is an illustration of exemplary code configurations for a location-based device configuration system according to various embodiments of the disclosure.

FIG. 4 is an illustration of exemplary code configurations 400 (e.g., similar to code configuration 320 in FIG. 3) for the location-based device configuration system 300 according to various embodiment of the disclosure. The code configurations 400 may be made/generated by various methods. The code configurations 400 may comprise, for example but without limitation, a key displacement 402, a vertical displacement level 406, a force level 408, a side-mounted displacement level 410, an eprom 412, a received light 414, a number of lights 416, a status of a light 418, a light pattern 420, or other coding methods. Each of the code configurations 400 can be implemented in the location receiver module 312 respectively as explained below.

The key displacement 402 method comprises the code configuration 316 (FIG. 3) based on a displacement 422 of a key (e.g., a house key, not shown). The displacement 422 displaces a spring 424 in a slot 432 in response to presence of the key. The displacement 422 on each of a plurality of springs 426 generates the code configuration 320 shown in FIG. 3. An uncoded module 404 is an example of the key displacement 402 without the key present showing that the springs 426 are not displaced. The key may comprise a key type such as, for example but without limitation, a pin-tumbler key, a transponder key, a double-sided key, a four-sided key, a paracentric key, a Internal cut key, an abloy key, a dimple key, a skeleton key, a tubular key, a zeiss key, a magnetic key, or other type of key. The displacement may comprise, for example but without limitation, a pin displacement, a disk displacement, a 2-dimensional displacement, a 3-dimensional displacement, or other displacement type.

The vertical displacement level 406 method (e.g., how far displaced) comprises the code configuration 320 based on an amount of the displacement 422 of the springs 426.

The force level 408 method (e.g., how much force) comprises a code configuration based on an amount of force exerted by the displacement 422 of the springs 426. The force may be exerted by, for example, a key as explained above.

The side-mounted displacement level 410 method comprises a code configuration based on a presence or absence of electrical connections to a plurality of contacts. For example, side mounted contacts closed by raised buttons on a bracket.

The eprom 412 method comprises a code configuration such as a code 430 read from an erasable programmable read only memory (eprom).

The received light 414 method (e.g., how much light) comprises a code configuration based on an amount of light received.

The number of lights 416 method (e.g., how many lights) comprises a code configuration based on a number of lights whose light is received.

The status of a light 418 method (e.g., which light) comprises a code configuration based on light from which light is received from.

The light pattern 420 method comprises a code configuration based on a pattern of light received.

Figure 5:
FIG. 5 is an illustration of an exemplary 2-D code configuration for a location-based device configuration system according to an embodiment of the disclosure.

FIG. 5 is an illustration of an exemplary 2-D code configuration 500 (2-D key 500) for a location-based device configuration system according to an embodiment of the disclosure. The 2-D code configuration 500 may comprise, for example but without limitation, raised bumps, reflective and non-reflective surfaces, color surfaces, black and white surfaces, magnetic intensity variations, a bar code, or other coding methods.

Figure 6:
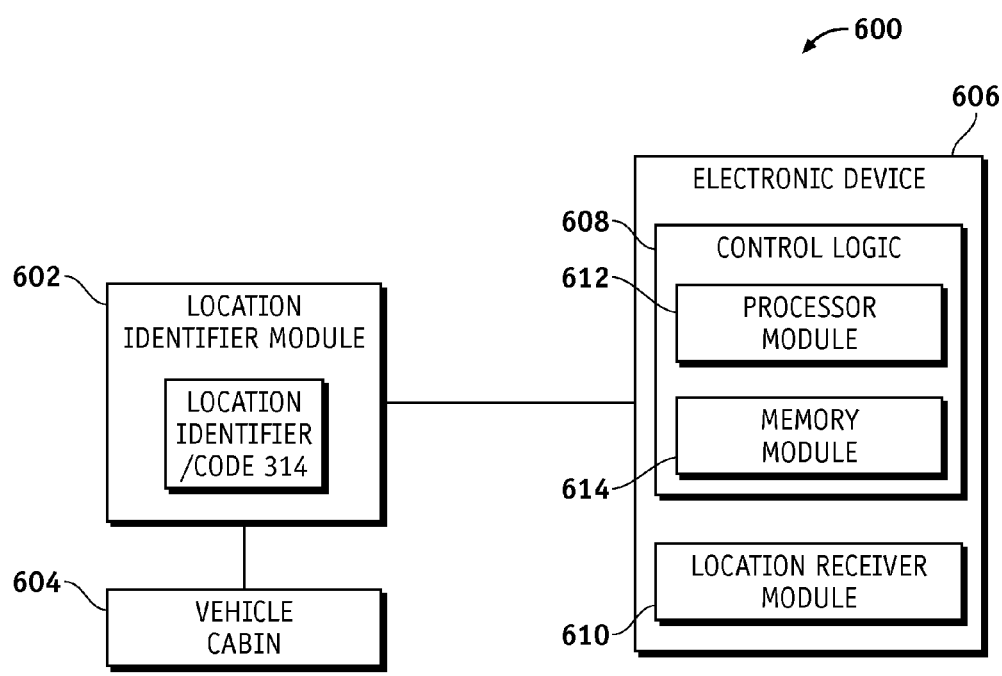
FIG. 6 is an illustration of an exemplary location-based device configuration system according to an embodiment of the disclosure.

FIG. 6 is an illustration of an exemplary location-based device configuration system 600 (system 600) according to an embodiment of the disclosure. The system 600 may comprise a location identifier module 602 (306 in FIG. 3), a vehicle cabin 604, and an electronic device 606.

The location identifier module 602 is operable to indicate a location. The location identifier module 602 may indicate the location according to a code configuration (location identifier) based on, for example but without limitation, a physical linear key (e.g., like a house key), a 2-D key 500 (FIG. 5), a wireless key or other key code method as explained above in the context of discussion of the code configurations 400.

The electronic device 606 comprises a location receiver module 610 and control logic 608.

The location receiver module 610 (312 in FIG. 3) receives the location via a location identifier such as the code 314 from the location identifier module 602. For example, the location receiver module 610 receives a location in the cabin 302 shown in FIG. 3 at the row 014, seat 7 via the code 314 from the location identifier module 602. In this manner, the location receiver module 610 pairs the seat light switch 310 to the light.

The control logic 608 configures the electronic device 606 based on the location identifier/code configuration of the location identifier module 602. The control logic 608 may comprise, for example but without limitation, a processor module 612, a memory module 614, or other module. The control logic 608 may be implemented as, for example but without limitation, a part of an aircraft system, a centralized aircraft processor, a subsystem computing module devoted to the location-based device configuration system 300, or other processor.

The control logic 608 is configured to control the location-based device configuration system 300 to configure the electronic device 606 according to various operation conditions. The operation conditions may comprise, for example but without limitation, flight operation conditions, ground operation conditions, or other operation condition. The flight conditions may comprise, for example but without limitation, take off, cruise, approach, landing, or other flight condition. The ground operation conditions, may comprise, for example but without limitation, taxiing, fuelling, maintenance, pre-flight check, post flight check, or other operation.

In operation, the control logic 608 may control the electronic device 606 by, for example but without limitation, pairing the electronic device 606 to another object to control the other object. The other object may comprise, for example but without limitation, a light, a fan, a window shade, or other device.

The processor module 612 comprises processing logic that is configured to carry out the functions, techniques, and processing tasks associated with the operation of the system 300. In particular, the processing logic is configured to support the system 300 described herein. For example, the processor module 612 may direct the location identifier module 602 to indicate a location.

The processor module 612 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 614 may comprise a data storage area with memory formatted to support the operation of the system 300. The memory module 614 is configured to store, maintain, and provide data as needed to support the functionality of the system 600. For example but without limitation, the memory module 614 may store flight configuration data, locations such as seat numbers, locations of objects such as light locations, code configurations/location identifier of various key code methods, or other data.

In practical embodiments, the memory module 614 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 614 may be coupled to the processor module 612 and configured to store, for example but without limitation, a database, and the like. Additionally, the memory module 614 may represent a dynamically updating database containing a table for updating the database, and the like. The memory module 614 may also store, a computer program that is executed by the processor module 612, an operating system, an application program, tentative data used in executing a program, or other application.

The memory module 614 may be coupled to the processor module 612 such that the processor module 612 can read information from and write information to the memory module 614. For example, the processor module 612 may access the memory module 614 to access seat numbers, light locations, code configuration/location identifiers, an aircraft speed, a flight control surface position, an angle of attack, a Mach number, an altitude, an aircraft weight-off wheels condition, or other data.

As an example, the processor module 612 and memory module 614 may reside in respective application specific integrated circuits (ASICs). The memory module 614 may also be integrated into the processor module 612. In an embodiment, the memory module 614 may comprise a cache memory for storing temporary variables or other intermediate information during execution of instructions to be executed by the processor module 612.

Figure 7:
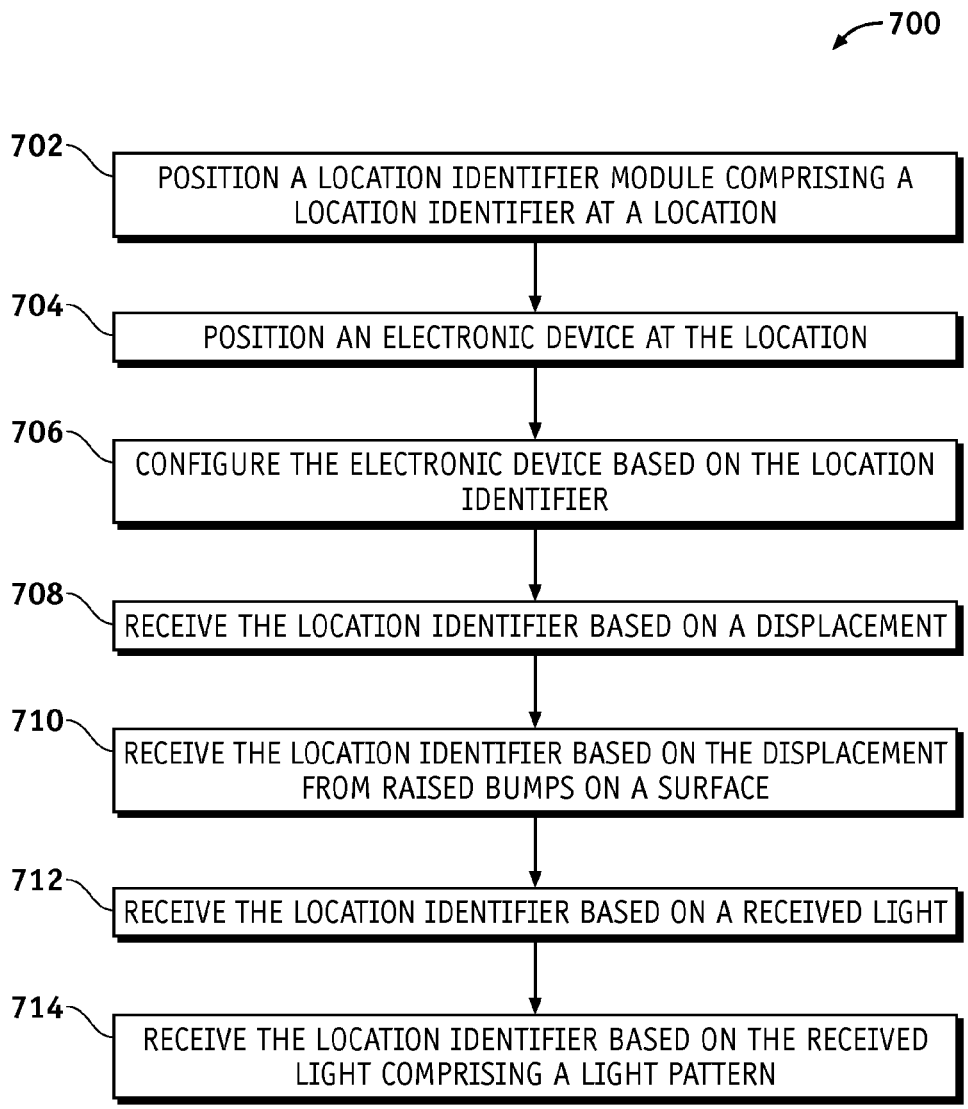
FIG. 7 is an illustration of an exemplary flowchart showing a process for configuring an electronic device according to an embodiment of the disclosure.

FIG. 7 is an illustration of an exemplary flowchart showing a process 700 (process 700) for configuring an electronic device according to an embodiment of the disclosure. The various tasks performed in connection with process 700 may be performed mechanically, by software, hardware, firmware, computer-readable software, computer readable storage medium, or any combination thereof. It should be appreciated that process 700 may include any number of additional or alternative tasks, the tasks shown in FIG. 7 need not be performed in the illustrated order, and the process 700 may be incorporated into a more comprehensive procedure or process having additional functionality not described in detail herein.

For illustrative purposes, the following description of process 700 may refer to elements mentioned above in connection with FIGS. 1-6. In practical embodiments, portions of the process 700 may be performed by different elements of the system 300 such as: the location identifier module 602, the vehicle cabin 604, the electronic device 606, the location receiver module 610, the control logic 608, etc. It should be appreciated that process 700 may include any number of additional or alternative tasks, the tasks shown in FIG. 7 need not be performed in the illustrated order, and the process 700 may be incorporated into a more comprehensive procedure or process having additional functionality not described in detail herein.

Process 700 may begin by positioning a location identifier module such as the location identifier module 306/602 comprising a location identifier at a location such as the row 014, seat 7 shown in FIG. 3 above (task 702).

Process 700 may continue by positioning an electronic device 606 such as the electronic device 606 at the location (task 704).

Process 700 may continue by a control logic 608 such as the control logic 608 configuring the electronic device 606 based on the location identifier (task 706).

Process 700 may continue by a location receiver module 610 such as the location receiver module 610 receiving the location identifier based on a displacement such as the key displacement 402 or the vertical displacement level 406 (task 708).

Process 700 may continue by the location receiver module 610 receiving the location identifier based on the displacement from raised bumps on a surface (task 710). The raised bumps may be on a surface of, for example but without limitation, a mounting plate for mounting the electronic device 606, or other surface.

Process 700 may continue by the location receiver module 610 receiving the location identifier based on a received light such as the received light 414 (task 712).

Process 700 may continue by the location receiver module 610 receiving the location identifier based on the received light comprising a light pattern such as the light pattern 420 (task 714).

In this manner, the embodiments of the disclosure provide various means for providing a location based device configuration.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-6 depict example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 612 to cause the processor module 612 to perform specified operations. Such instructions, generally referred to as "computer program code" or "program code" (which may be grouped in the form of computer programs or other groupings), when executed, enable the location receiver module 610 of the system 300/600.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for configuring an electronic device, wherein the electronic device is configured within an aircraft, the method comprising:
   positioning a location identifier module comprising a location identifier comprising a code configuration at a location, the code configuration comprising a physical configuration;
   positioning the electronic device at the location to directly plug the electronic device into the location identifier module;
   configuring the electronic device based on the electronic device mechanically receiving the code configuration directly from the location identifier module;
   and pairing the electronic device to a second device via the code configuration to electro-mechanically control the second device.

2. The method of claim 1, further comprising receiving the location identifier based on a receiver module receiving the code configuration.

3. The method of claim 1, further comprising receiving the location identifier from a surface comprising the code configuration.

4. The method of claim 1, wherein the code configuration comprises a 2D code configuration comprising raised bumps.

5. A location-based device configuration system comprising: a location identifier module operable to indicate a location identifier comprising a code configuration, the code configuration comprising a physical configuration; and an aircraft electronic device configured within an aircraft, comprising:
   a location receiver module operable to mechanically receive the code configuration from the location identifier module when the aircraft electronic device is directly plugged into the location identifier module; and
   control logic operable to configure an operation of the electronic device based on the code configuration thereby pairing the aircraft electronic device to a second device via the code configuration to electro-mechanically control the second device.

6. The location-based device configuration system of claim 5, wherein the location receiver module is further operable to receive the location identifier from a surface comprising the code configuration.

7. The location-based device configuration system of claim 5, wherein the location receiver module is further operable to receive the location identifier based on a key.

8. The location-based device configuration system of claim 7, further comprising the key.

9. The location-based device configuration system of claim 7, wherein the key comprises a pin-tumbler key, a transponder key, a double-sided key, a four-sided key, a paracentric key, a Internal cut key, an abloy key, a dimple key, a skeleton key, a tubular key, a zeiss key, or a magnetic key.

10. The location-based device configuration system of claim 7, wherein the key comprises a pin displacement, a disk displacement, a 2-dimensional displacement, or a 3-dimensional displacement.

11. The location-based device configuration system of claim 5, wherein the code configuration comprises 2D code configuration comprising raised bumps.

12. A location configurable device comprising: an aircraft electronic device configured within an aircraft, comprising a location receiver module operable to mechanically receive a location identifier comprising a code configuration from a location identifier module when the aircraft electronic device is directly plugged into the location identifier module, the code configuration comprising a physical configuration; and
   control logic operable to configure an operation of the location configurable device based on the code configuration thereby pairing the electronic device to a second device via the code configuration to electro-mechanically control the second device.

13. The location configurable device of claim 12, wherein the location receiver module is further operable to receive the location from a surface comprising the code configuration.

14. The location configurable device of claim 12, wherein the location receiver module is further operable to receive the location identifier based on-a key.

15. The location configurable device of claim 14, wherein the key comprises: a pin-tumbler key, a transponder key, a double-sided key, a four-sided key, a paracentric key, a Internal cut key, an abloy key, a dimple key, a skeleton key, a tubular key, a zeiss key, or a magnetic key.

16. The location configurable device of claim 14, wherein the key comprises a pin, a disk, 2-dimensions, or 3-dimensions.

17. The location configurable device of claim 12, wherein the location identifier is based on: a key displacement, a vertical displacement level, a force level, a side-mounted displacement level, or an eprom.

* * * * *